United States Patent
Nasiell (10) Patent No.: US 9,566,652 B2
(45) Date of Patent: Feb. 14, 2017

(54) CORDLESS CLAMPING HANDLE TUBING CUTTER TOOL

(71) Applicant: Gustav M. Nasiell, Laguna Woods, CA (US)

(72) Inventor: Gustav M. Nasiell, Laguna Woods, CA (US)

(73) Assignee: Gustav M. Nasiell, Laguna Woods, CA (US)

( * ) Notice: Subject to any disclaimer, the term of this patent is extended or adjusted under 35 U.S.C. 154(b) by 440 days.

(21) Appl. No.: 13/975,308

(22) Filed: Aug. 24, 2013

(65) Prior Publication Data

US 2013/0340257 A1    Dec. 26, 2013

Related U.S. Application Data

(63) Continuation-in-part of application No. 13/066,964, filed on Apr. 29, 2011.

(51) Int. Cl.
*B23D 21/08* (2006.01)
*B23D 21/04* (2006.01)

(52) U.S. Cl.
CPC ............ *B23D 21/04* (2013.01); *B23D 21/08* (2013.01)

(58) Field of Classification Search
CPC .................... B23D 21/06–21/12; B26D 3/169
USPC ........ 30/93–97, 101–108; 82/46, 70.1, 70.2; D8/60, 61
See application file for complete search history.

(56) References Cited

U.S. PATENT DOCUMENTS

| | | | | |
|---|---|---|---|---|
| 18,918 A * | 12/1857 | Lloyd | .................... | B23D 21/08 30/96 |
| 377,725 A * | 2/1888 | Thompson | ............. | B23D 21/08 30/96 |
| 1,279,022 A * | 9/1918 | Scott | ...................... | B23D 21/08 30/96 |
| 1,335,660 A * | 3/1920 | Conley | .................. | B23D 21/10 30/96 |
| 1,373,300 A * | 3/1921 | Caffrey | .................. | B23D 21/08 30/96 |
| 2,189,350 A * | 2/1940 | Morris | ................... | F16L 21/005 285/373 |
| 2,317,944 A * | 4/1943 | Schaefer | .............. | H02G 1/1224 30/96 |
| 2,615,516 A * | 10/1952 | Hyde | ..................... | B26D 3/169 30/96 |
| 2,880,761 A * | 4/1959 | Peter | ...................... | B65D 59/00 285/373 |
| 3,672,050 A * | 6/1972 | Hanback | ................ | B23D 21/08 30/101 |

(Continued)

*Primary Examiner* — Jason Daniel Prone
(74) *Attorney, Agent, or Firm* — William L. Chapin (57) ABSTRACT

A hand tool for cutting tubular workpieces such as copper tubing used for plumbing includes a rotary cutting head which has a slot for receiving a length of tubing to be cut, a gear drive mechanism for rotating the cutting head, and a clamping handle which supports the gear drive mechanism, which is rotatably driven by a battery powered electric motor. to thus rotate the cutting head to sever a length of tubing. The clamping handle includes a pair of longitudinally disposed, generally semi-cylindrically-shaped handle shells which are pivotable apart from one another to receive a length of tubing to be cut, and pivotable to a closed position and compressed in the palm of a workman's hand to press against and clamp the tool to a length of tubing being cut.

9 Claims, 11 Drawing Sheets

(56) References Cited

U.S. PATENT DOCUMENTS

| | | | | |
|---|---|---|---|---|
| 3,982,779 A | * | 9/1976 | Hickey | F16L 21/06 285/373 |
| 4,114,266 A | * | 9/1978 | Erpenbeck | B26B 27/00 30/96 |
| D255,642 S | * | 7/1980 | Erpenbeck | 30/96 |
| 4,311,407 A | * | 1/1982 | Doyle | F16B 7/04 403/390 |
| 4,393,998 A | * | 7/1983 | Allen | F16L 3/18 156/306.9 |
| 4,536,102 A | * | 8/1985 | Doyle | E04G 7/18 403/390 |
| 4,574,664 A | * | 3/1986 | Curry | E21B 19/163 81/57.19 |
| 4,769,911 A | * | 9/1988 | Araki | B23D 21/04 30/95 |
| 4,802,278 A | * | 2/1989 | Vanderpol | B23D 21/08 30/101 |
| 5,103,699 A | * | 4/1992 | Brown | B23D 21/04 30/101 |
| 5,179,781 A | * | 1/1993 | Weaver | B23D 59/04 30/96 |
| 5,243,760 A | * | 9/1993 | May, Jr. | B26B 25/00 30/101 |
| 5,269,568 A | * | 12/1993 | Courturier | G09F 3/0323 285/423 |
| D376,974 S | * | 12/1996 | Chen | D8/396 |
| 6,065,212 A | * | 5/2000 | Lazarevic | B26D 3/169 30/101 |
| 6,202,307 B1 | * | 3/2001 | Wrate | B23D 21/08 30/101 |
| 6,430,815 B1 | * | 8/2002 | Wickline | B23D 21/08 30/101 |
| 6,637,115 B2 | * | 10/2003 | Walsh | B26D 3/169 30/101 |
| 6,671,962 B2 | * | 1/2004 | Watamura | B26D 3/169 30/95 |
| 7,013,567 B2 | * | 3/2006 | Myers | B23D 21/04 30/101 |
| 7,152,325 B2 | * | 12/2006 | Green | B23D 21/04 30/101 |
| D568,701 S | * | 5/2008 | Nasiell | D8/60 |
| D568,702 S | * | 5/2008 | Nasiell | D8/60 |
| 7,406,769 B1 | * | 8/2008 | Toussaint | B23D 21/04 30/101 |
| 7,743,510 B2 | * | 6/2010 | Lazarevic | B23D 21/04 30/101 |
| 7,845,080 B2 | * | 12/2010 | Nasiell | B23D 21/04 30/101 |
| 8,261,454 B2 | * | 9/2012 | Wilson, Jr. | B21D 7/04 30/95 |
| D697,592 S | * | 1/2014 | Hebert | D23/259 |
| D711,730 S | * | 8/2014 | McKiernan | D8/396 |
| 2007/0050984 A1 | * | 3/2007 | Bartoluzzi | B23D 21/04 30/93 |
| 2013/0340257 A1 | * | 12/2013 | Nasiell | B23D 21/04 30/97 |

* cited by examiner

CORDLESS CLAMPING HANDLE TUBING CUTTER TOOL

This application is a continuation-in-part of application Ser. No. 13/066,964, filed Apr. 29, 2011.

BACKGROUND OF THE INVENTION

A. Field of the Invention

The present invention relates to hand tools. More particularly, the invention relates to a hand tool for cutting tubular workpieces such as copper tubing used in plumbing systems which is operated by a pull-cord mechanism or an integral battery powered drive motor and thus does not require an electrical or pneumatic power source.

B. Description of Background Art

Plumbing used for hot and cold water service in most contemporary residences and other buildings employs copper tubing to distribute the water to various sites within the building, including bathrooms, showers, kitchens, laundry rooms, etc. At each such site, an elongated length of copper tubing connected to a source such as a water main or hot water heater must be cut to size and connected by a fitting to a water faucet, shower head, toilet tank, or other such fixture.

The number of individual fixture connections and hence number of tubing cuts which must be made during original construction or retrofitting of a building can be substantial. For example, an average full bathroom with a single sink and shower head requires at least 5 separate tubing cuts, and adding another sink increases the total to 7 cuts. Each additional bathroom adds 5 to 7 cuts, the kitchen adds at least 2 cuts for a sink and another 1 or 2 more cuts for a water purifier.

For residences which include a laundry room and/or one or more additional bathrooms, the number of cuts increases by 2 to 7 for each such additional site. Thus, as a bare minimum, even a very small apartment construction requires cutting at least 7 different lengths of copper tubing. A more typical apartment with 2 full baths, each having a double sink, and a kitchen requires making about 20 separate cuts. Thus, for a 100-unit apartment complex, typical plumbing installations would require making 2,000 or more separate cuts in copper tubing.

A traditional method of cutting copper tubing which is still in use consists of using a standard hacksaw to cut tubing to a length required for connecting the tubing to a faucet or other such fixture. A disadvantage of this method is that it is relatively slow, and typically results in a rough, non-square severed cut edge which can make connecting the cut edge of the tubing to a fixture problematic.

Other prior art methods of cutting copper tubing and similar tubular members employ a device which is clamped to a length of pipe or tubing with a screw clamp arrangement, and rotated multiple times around the circumference of the tubing. The device has a cutting blade which presses against the outer circumferential wall surface of the tubing, eventually severing the tubing to a required length. This method, while achieving cleaner, squarer cuts than a hacksaw is substantially time consuming.

In response to the above-described limitations of prior art tubing cutting methods and apparatus, the present inventor invented and disclosed in U.S. Pat. No. 7,845,080 a tubing cutting apparatus which includes a rotary cutting mechanism that has an open area for receiving a length of tubing and has a cutting head provided with a cutting blade for engaging the tubing. The cutting mechanism is powered by rotary power source such as a hand-held power tool, or by a self-contained drive motor. The apparatus includes a gear system for coupling rotary power from a rotary power source to the cutting mechanism and thereby rotating the cutting head and blade about a length of tubing. One embodiment of the disclosed apparatus includes a clamp comprising a slotted tubular leaf spring which protrudes from a handle case of the apparatus in longitudinal alignment with an open slotted area of the cutting mechanism. The apparatus clampingly engages a length of tubing to be cut by pushing opposed flanged edges of the leaf spring against the length of tubing, thus causing the edges to be pried apart against tension exerted by the spring. The edges than spring back to grip the tubing. This arrangement facilitates use of the apparatus in locations with limited accessibility, such as within a space behind a wall board of a structure.

The tubing cutting apparatus disclosed in U.S. Pat. No. 7,845,080 provides other substantial advantages over prior art tubing cutting tools. For example, the tubing cutter apparatus disclosed in U.S. Pat. No. 7,845,080 can be positioned and secured in place on a length of tubing, and used to make a clean, square, accurately located severing cut in the tubing, in a much shorter time than prior art cutting tools which require manual clamping operations. However, the present inventor has perceived the need for another type of tubing cutter apparatus which could be operated by hand power alone.

An apparatus powered by hand would be useful in remote areas which do not have a convenient source of electrical power or pneumatic power supplied by pressurized air. Also, it would be desirable to have a tubing cutter tool which was not electrically powered and could thus be used in hazardous locations containing combustible liquids or vapors without the possibility of an electric spark from a drive motor igniting a fire. Moreover, for some applications, it would be desirable to provide a tool for cutting tubular workpieces in which functions of providing a handle for holding the tool, and a mechanism for firmly gripping a length of tubing which was being cut by the tool, could be combined into a single structure.

Also, it would be desirable to provide a tubing cutter with a clamping handle and integral battery powered electric drive motor.

It would also be desirable to provide a tubing cutter tool which afforded the capability to a workman to readily adjust the number of rotations of a rotatable cutter head to the minimum number required to sever a length of tubing. Prior art powered tubing cutter tools typically are operated in a mode which causes a cutter head of the tool to rotate more than a minimum number to turns around the circumference of a tube, to ensure that a complete severing cut is made. The additional number of often unneeded turns requires additional valuable time which could be saved by a manually operated tubing cutter tool which a workman could readily operate in a mode in which a cutting head was rotated just a sufficient number of turns to cleanly sever a length of tubing but without any additional time consuming rotations of the cutting head. The foregoing considerations were motivating factors for the present invention.

OBJECTS OF THE INVENTION

An object of the present invention is to provide a portable hand-held tool for cutting tubular workpieces such as copper tubing, which includes a rotating cutting head that is driven by a hand-operated pull-cord mechanism.

Another object of the invention is to provide a portable hand-held tubing cutter tool which has a clamping handle that facilitates using a single hand to both hold the tool and clampingly engage a length of tubing to the cut.

Another object of the invention is to provide a pull-cord powered portable hand tool for cutting tubing, which has a handle that has a handle grip for supporting the tool and clamping jaws for clamping the tool to a length of tubing to be cut when the handle is grasped and squeezed.

Another object of the invention is to provide a portable hand tool for cutting tubing which has a body and handle grip for supporting the tool and clamping jaws for clamping the tool to a length of tubing to be cut when the handle is grasped and squeezed, and that has attached to the body a rotatable cutting head which is rotatably driveable by an integral battery powered electric motor.

Various other objects and advantages of the present invention, and its most novel features, will become apparent to those skilled in the art by perusing the accompanying specification, drawings and claims.

It is to be understood that although the invention disclosed herein is fully capable of achieving the objects and providing the advantages described, the characteristics of the invention described herein are merely illustrative of the preferred embodiments. Accordingly, we do not intend that the scope of our exclusive rights and privileges in the invention be limited to details of the embodiments described. We do intend that equivalents, adaptations and modifications of the invention reasonably inferable from the description contained herein be included within the scope of the invention as defined by the appended claims.

SUMMARY OF THE INVENTION

Briefly stated the present invention comprehends a hand-held portable tool for cutting tubular workpieces such as copper tubing used in plumbing systems, which include a clamping handle and a novel pull-cord powering mechanism or an electric motor powered by a self-contained battery.

A basic embodiment of a portable hand held tubing cutter tool according to the present invention includes a pull-cord drive wheel mechanism for converting linear pulling power exerted by a workman into rotary motion of a drive wheel pulley. The tool includes a gear drive mechanism mounted on top of the pull-cord drive wheel mechanism, and a cutting mechanism including a crescent-shaped, slotted cutting head mounted on top of the gear drive mechanism. Rotary power generated by the pull-cord drive wheel mechanism in response to a workman's brisk pulling on a handle at the outer end of a pull-cord wrapped around a drive wheel is coupled through the gear drive mechanism to the cutting mechanism. Rotation of a blade in the cutting mechanism in contact with the outer circumferential surface of a length of tubing positioned in the slot of the cutter head is effective in severing the tubing.

The pull-cord drive wheel mechanism includes a spirally wound, flat tension spring which is similar to a clock main spring, and is effective in rotating the drive wheel in an opposite direction to thus retract and re-wind the pull-cord around the drive wheel pulley, when tension is released on the drive cord pull handle.

The tubing cutter tool according to the present invention includes a clamping handle which protrudes downwardly from the gear-drive mechanism. The clamping handle includes a pair of longitudinally disposed generally semi-cylindrically-shaped handle shells which are pivotable apart to form an open space for receiving a length of tubing. The handle is moved laterally towards a vertically disposed length of tubing to encompass a length of tubing in the open space between the handle shells, which are then pivoted towards one another to form a cylindrical space in which the tubing is located. Opposed inner concave sides of the handle shell exert a compressive gripping force on the tubing when the outer surface of the handle shells are grasped in the palm of a workman's hand.

An alternate embodiment of a portable tubing cutter tool with clamping handle according to the present invention includes a gear drive mechanism which has rotary power input socket that is rotatable by a complementary shaped drive pin which is inserted into the socket and rotated by of an external rotary power source such as a power drill.

Another embodiment of a portable tubing cutter tool with clamping handle according to the present invention includes a rotary electric motor rather than a pull-cord drive wheel mechanism for providing rotary power to the gear drive mechanism and cutting mechanism. The motor is located in a housing below the gear drive mechanism, and is powered by an integral electric battery located in a battery housing which extends rearward from the lower end part of the clamping handle.

DESCRIPTION OF THE PREFERRED EMBODIMENTS

FIGS. 1-10 illustrate embodiments of a tubing cutter with a clamping handle according to the present invention which are powered by a pull-cord mechanism. FIG. 11 illustrates another embodiment of a tubing cutter with a clamping handle according to the present invention, which is powered by an external rotary power source such as an electric drill.

FIGS. 12-17B illustrate another embodiment of the tubing cutter which has an internal electric drive motor and battery.

Figure 1:
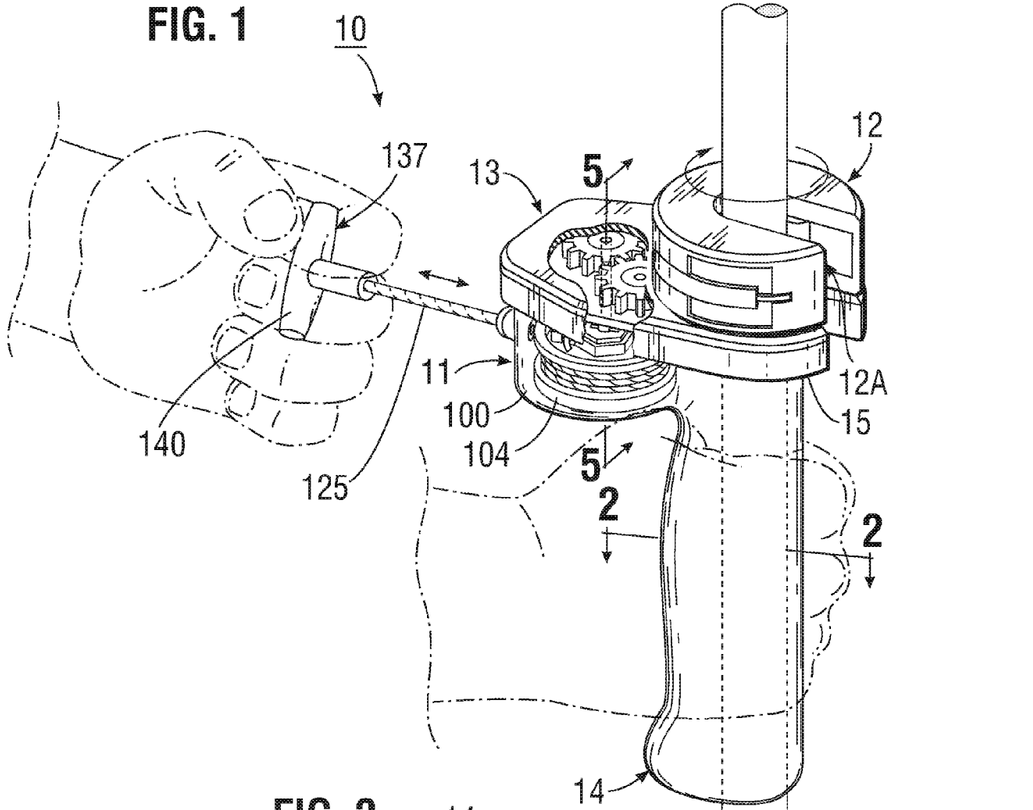
FIG. 1 is a partly broken away perspective view of a pull-cord operated tubing cutter tool with clamping handle according to the present invention.
Figure 2:
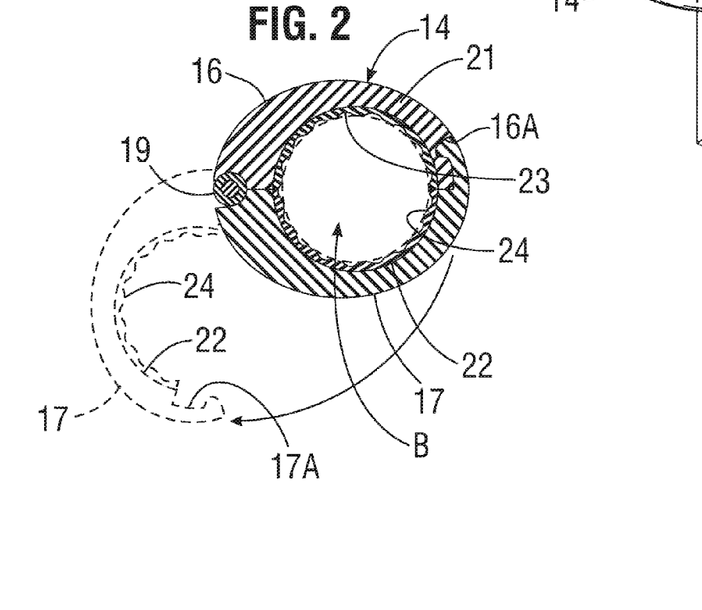
FIG. 2 is a transverse sectional view of a compression grip clamping handle of the tool of FIG. 1.

Referring to FIGS. 1 and 2, a pull-cord operated tubing cutter 10 with clamping handle according to the present invention may be seen to include a pull-cord drive wheel mechanism 11 for converting linear pulling power to rotary drive power, a gear drive mechanism 13, rotatable by the pull-cord drive wheel mechanism, a crescent-shaped cutter head 12 mounted on top of and rotatably driven by the gear drive mechanism and an elongated clamping handle 14 which is depends perpendicularly downwards from the gear drive mechanism, in coaxial alignment with the cutter head. As shown in FIGS. 1-5, gear drive mechanism 13 has an elongated flat base plate 15. Clamping handle 14 protrudes downwards from a front part of the lower surface of the base plate 15, and pull-cord drive mechanism 11 protrudes downwardly from a rear part of the lower surface of the base plate 15.

Figure 5:
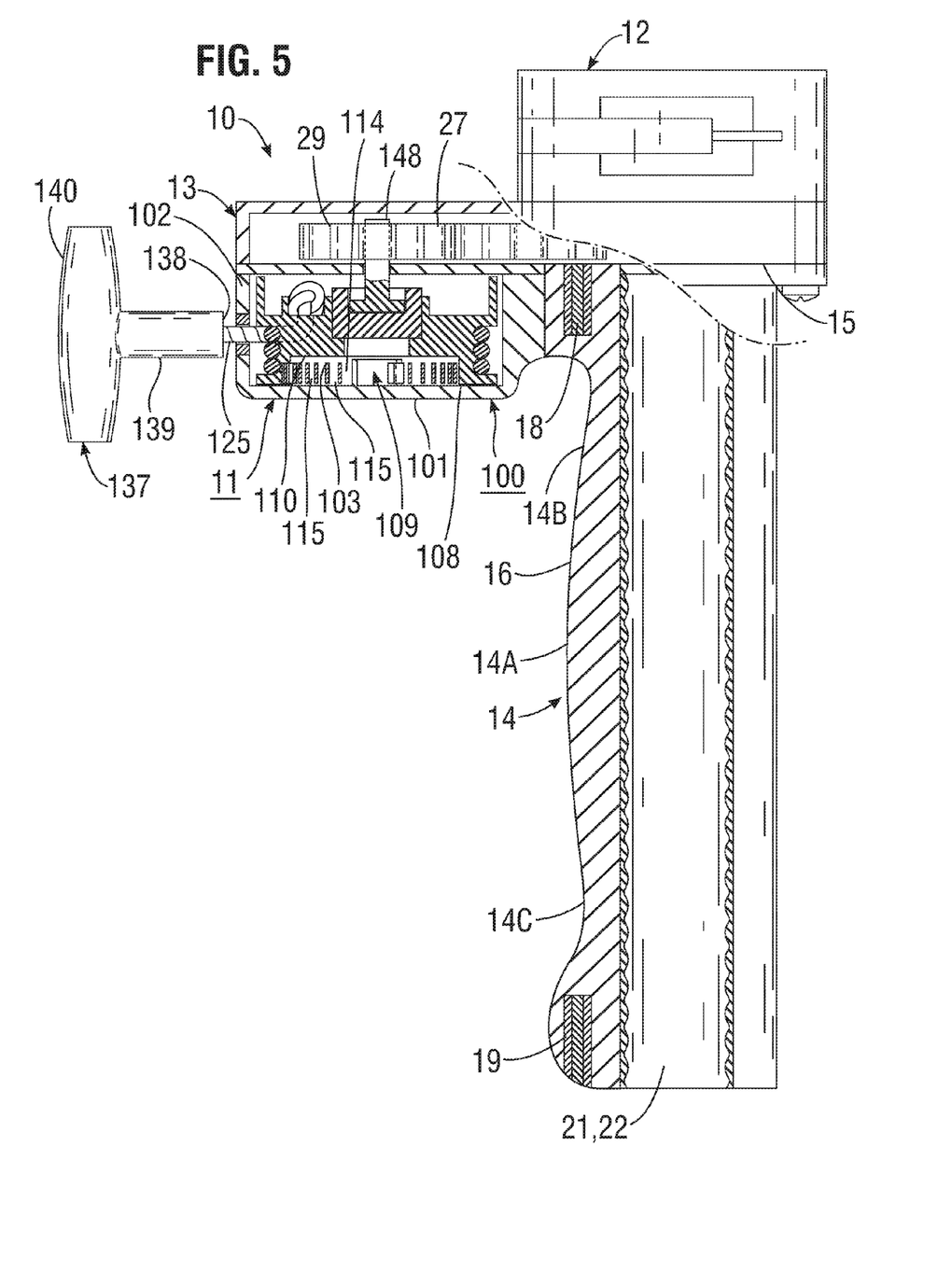
FIG. 5 is a part side elevation, part medial longitudinal sectional view of the tool of FIG. 1 taken in the direction indicated by the line 5-5.

As may be seen best by referring to FIGS. 1, 2 and 5, clamping handle 14 is constructed of two generally semi-cylindrically-shaped vertically elongated shells 16 and 17 including a fixed handle shelf 16 that is mounted fixedly to the lower surface of gear mechanism base plate by a first, upper attachment pin 18. Handle 14 includes a second, pivotable handle shell 17 which has a shape that is generally mirror symmetric to that of fixed handle shell 16, through a vertical longitudinal medial plane of the handle. Pivotable handle shell 17 is pivotably mounted at an upper end thereof to a lower part of upper attachment pin 18, and at a lower end thereof to the lower end portion of fixed handle shell 16 by a second, vertically disposed, lower pivot pin 19. (See FIG. 5.)

As may be seen best by referring to FIG. 2, fixed handle shell 16 and pivotable handle shell 17 have disposed longitudinally or vertically through their lengths elongated semi-circular cross section bores 21, 22 which are have secured to concave wall surfaces thereof elongated semi-cylindrically-shaped elastomeric or friction pads 23, 24.

As shown in FIGS. 1 and 2, when handle shells 16 and 17 are pivoted towards one another and a compressive force exerted on the outer surfaces of the handle shells by being gripped in the palm of a person's hand, a compressive gripping force may be exerted on the outer circumferential surface of a length of tubing T or pipe to thus retain the tool 10 in a fixed position relative to the tubing, as shown in FIG. 1.

Optionally, as shown in FIG. 2, the outer vertically disposed longitudinal edges of handle shells 16 and 17 opposite pivot pins 18 and 19 may have formed therein tongue-and-groove type interlocking edges 16A, 17A, to help maintain a compressive force on a pipe, length of tubing, or other such tubular workpiece.

As shown in FIG. 5, the rear longitudinally disposed surface of handle 14 preferably has a curved shape to facilitate grasping the handle in a workman's hand, and includes a convex arcuately curved elongated center section 14A, and an arcuately inwardly curved upper and lower end sections 14B, 14C.

As shown in FIG. 5, the rear longitudinally disposed surface of handle 14 preferably has a curved shape to facilitate grasping the handle in a workman's hand, and includes a convex arcuately curved elongated center section 14A, and arcuately inwardly curved upper and lower end sections 14B, 14C, respectively.

Figure 3:
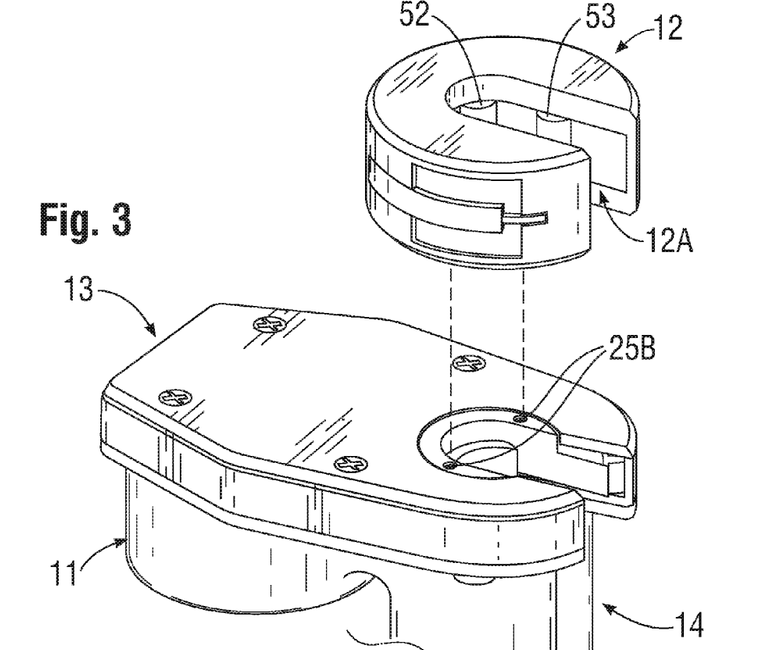
FIG. 3 is a fragmentary exploded view of the tool of FIG. 1 showing the mounting of the cutting head of the tool of FIG. 1 to the gear mechanism thereof.
Figure 4A:
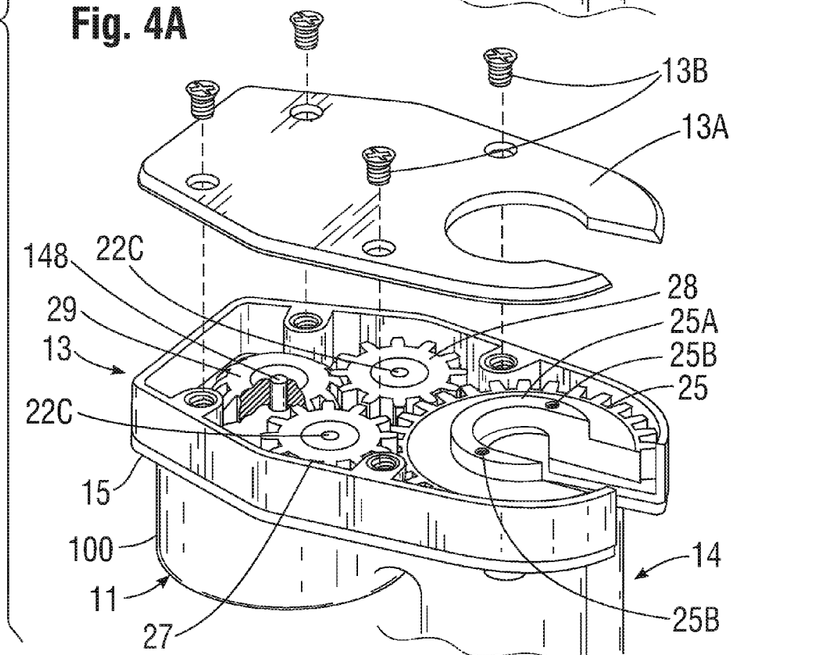
FIG. 4A is a fragmentary view of the tool of FIG. 1, showing a gear drive mechanism thereof with its cover plate removed.
Figure 4B:
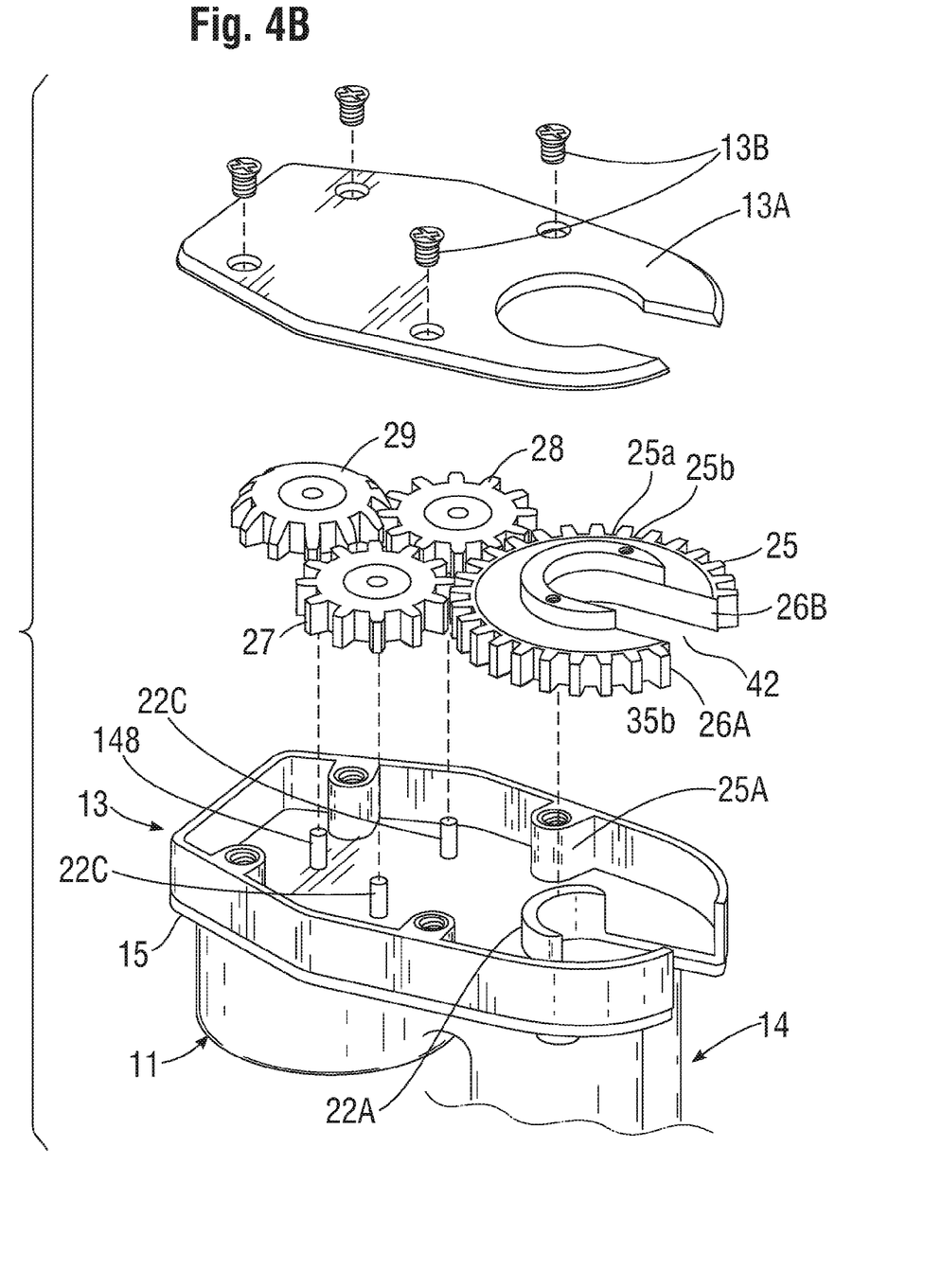
FIG. 4B is an exploded view of the gear drive mechanism of FIG. 3.

Referring to FIGS. 3, 4A and 4B, it may be seen that gear drive mechanism 13 includes in planar arrangement and sequence of connection, a C-shaped gear 25, a pair of intermediate circular gears 27, 28 that do not engage each other, and a circular driving gear 29. Both intermediate gears 27, 28 engage on front sides thereof C-shaped gear 25 and on rear sides thereof engage driving gear 29. In this manner driving gear 29 engages and simultaneously rotates both intermediate gears 27, 28 and in turn intermediate gears 27, 28 engage and simultaneously rotate C-shaped gear 25.

As shown in FIG. 4B, two intermediate gears 27, 28 are required because for some rotational positions, one or the other of intermediate gears 27, 28 will be in the gap 42 in the C-shaped gear defined by shoulders 26A, 26B and hence will be out of contact with C-shaped gear 25. Thus, intermediate gears 27, 28 are positioned so that at least one of these gears is always in contact with the C-shaped gear 25 such that there is no break in the rotation of C-shaped gear 25. C-shaped gear 25 has a raised portion 25A for attachment to cutting head 12 as will be described.

As shown in FIGS. 4A, 4B and 5, base plate 15 of gear drive mechanism 13 has two mounting posts 22c, which rotatably support intermediate gears 27, 28 to base plate 15. Driving gear 29 is pinned to the shank of a drive pin 148 which protrudes upwardly from pull-cord drive wheel mechanism 11 through a hole in the base plate 15 of the gear drive mechanism. Gear drive mechanism 13 has a cover plate 13A which is secured to base plate 15 by screws 13B, thereby capturing gear mechanism 21. As shown in FIG. 4B, a semi-cylindrical bearing sleeve 22a is vertically attached to base plate 15 and when the cutting apparatus is assembled extends upward through the open area of C-shaped gear 25 to provide a bearing about which gear 25 rotates.

As may be envisioned by referring to FIGS. 1 and 3-4B, rotation of circular driving gear 29 causes cutter head 12 to rotate in contact with the outer circumferential wall surface of a tube T disposed through a longitudinally disposed slot 12A in the cutter head to thereby cause a cutting blade which is urged through a transversely disposed slot in an inner wall of slot 12A to form a circular cut through the tube. The construction and operation of gear mechanism 13 and cutter head 12 are exactly similar to those of the gear system 21 and cutter 12 described in U.S. Pat. No. 7,845,080, the description of which is hereby incorporated in its entirety into the present specification. Cutter head 12 is attached to C-shaped gear 25 by screws (not shown) which protrude downwards from the cutter head and are received in threaded bores 25B in the upper surface of the C-shaped gear.

Figure 7A:
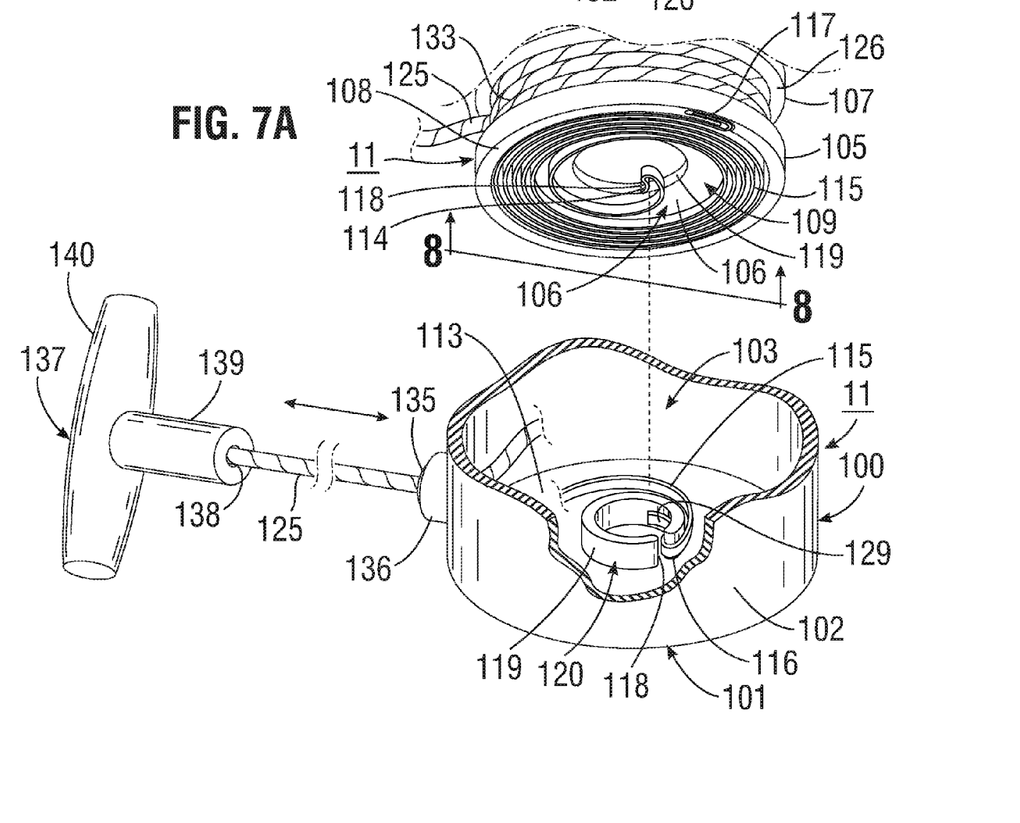
FIG. 7A is an exploded perspective view of the pull-cord drive wheel mechanism of FIG. 6.
Figures 7B, 7C, 7D:
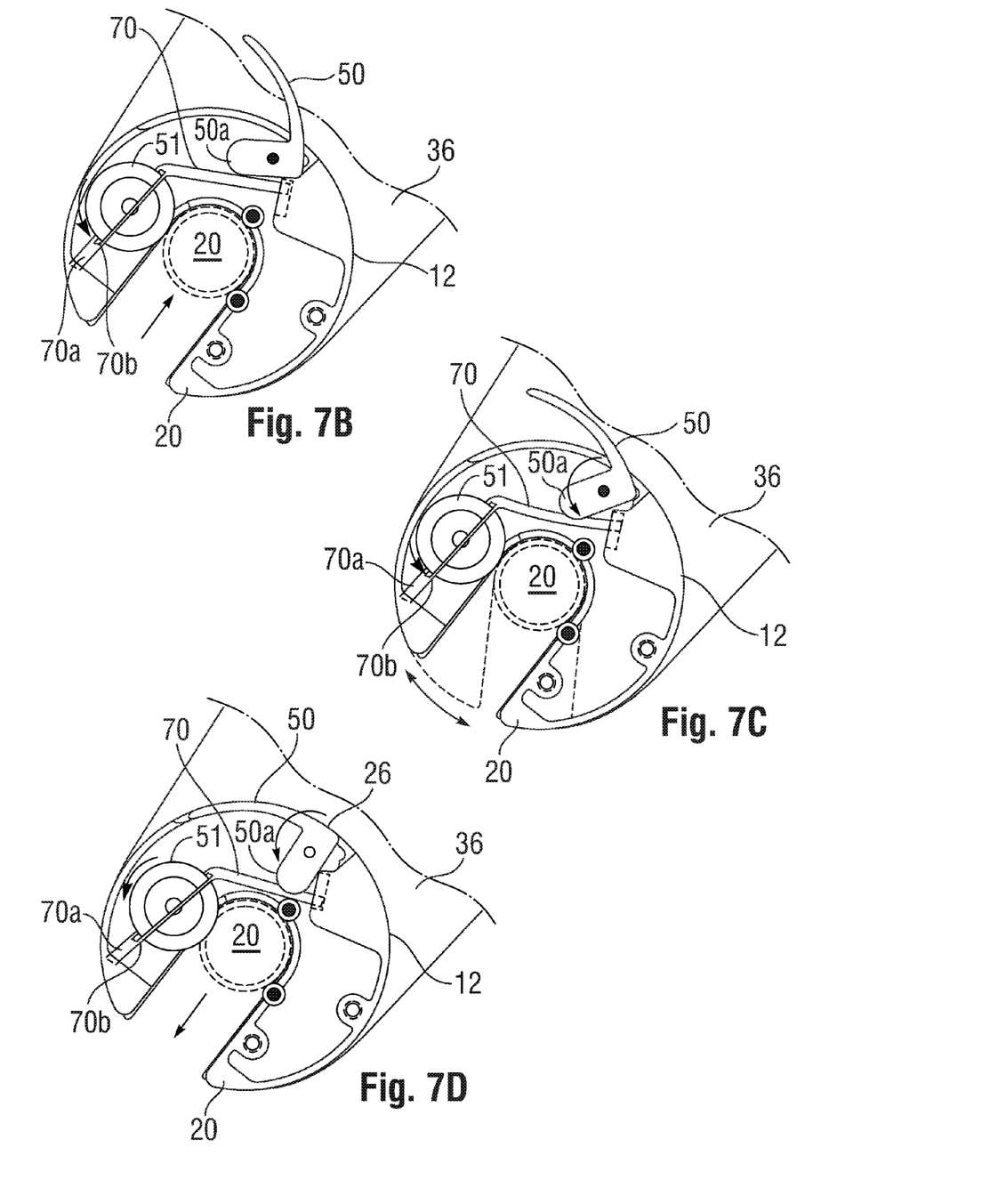
FIG. 7B is a cut-away view which illustrates the interior mechanism of the cutting head with a locking lever thereof in an open position.
FIG. 7C illustrates partial closure of the locking lever urging contact of the cutting blade with the tubing.
FIG. 7D illustrates full closure of the locking lever with resultant cutting of the tubing.

FIGS. 7B-7D illustrate the manner in which a tension spring 70 is used in cutting head 12 to urge retraction of a rotary cutting blade head 51 from a length of tubing 20 when a locking lever 50 is an open position; lever 50 having a cammed part 50a that at the closure of lever 50 overcomes force exerted by spring 70 to urge cutting contact of the cutting blade 51 with the tubing 20. FIG. 7B illustrates initial positioning of the cutting blade within the cutting head 12 with the locking lever 50 in the open position. The cammed part 50a of locking lever 50 rides on tension spring 70, which has an extension arm 70a with a slot 70b for receiving cutting blade 51 therein. When lever 50 is in the open position spring 70 is in an unloaded state in which cutting blade 51 does not forcibly contact tube 20. FIG. 7C illustrates partial closure of the locking lever 50 with the cammed part 50a of the lever depressing to partially load spring 70 thereby urging the cutting blade 51 into contact with tubing 20. FIG. 7D illustrates complete closure of the locking lever 50 whereby the spring 70 is loaded sufficiently to force cutting blade 51 to cut the tubing 20. After cutting of the tubing 30 the lever 50 is opened, thereby unloading spring 70 whereby the cutting blade 51 returns to its non-cutting mode.

Figure 6:
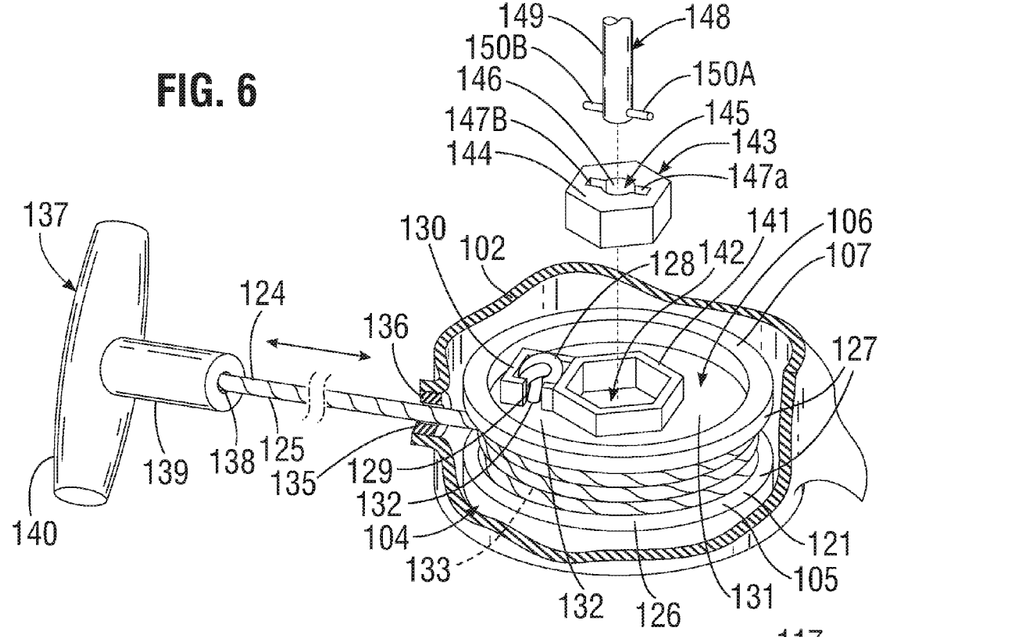
FIG. 6 is a partly sectional exploded perspective view of a pull-cord drive wheel mechanism of the tool of FIG. 1.

The structure and operation of pull-cord drive wheel mechanism 11 of tubing cutter 10 may be best understood by reference to FIGS. 1, 5, 6, 7A and 9. As shown in FIGS. 5 and 7A pull-cord power drive wheel mechanism 11 includes a housing 100 which has generally the shape of a short, circular cross-section cylindrical box that has a circular base plate 101 and a circular cross-section, cylindrically-shaped, uniform thickness flange wall 102 which protrudes perpendicularly upwards from the outer circumferential edge of the base plate.

As shown in FIGS. 5 and 7A, housing 100 of drive wheel mechanism 11 has between base plate 101 and cylindrical flange wall 102 a hollow cylindrically-shaped interior space 103 which contains a rotatable circular cross section drum or pulley 104. As shown in FIG. 7A, pulley 104 has at a lower or base end thereof a transversely disposed annular ring-shaped flange or lower pulley sheave 105 which protrudes radially outwards from a vertically disposed, longitudinally centrally located cylindrically-shaped central body 106 of the pulley. Pulley 104 also has at an upper end thereof an annular ring-shaped flange or upper pulley sheave 107. Upper pulley sheave 107 has a size and shape similar to that of lower pulley sleeve 105, and also protrudes radially outwards of central body 106 of the pulley.

As may be seen best by referring to FIGS. 5 and 7A, pulley 104 has protruding perpendicularly upwards from a lower face 108 thereof into central body 106 thereof a circular blind bore 109 which has a diameter that is slightly less than that of cylindrical central body 106 of the pulley. Bore 109 terminates in an upper transversely disposed end wall 110, and forms with the upper surface 113 of pulley housing base plate 101 a hollow cylindrically-shaped space 114.

Figure 8:
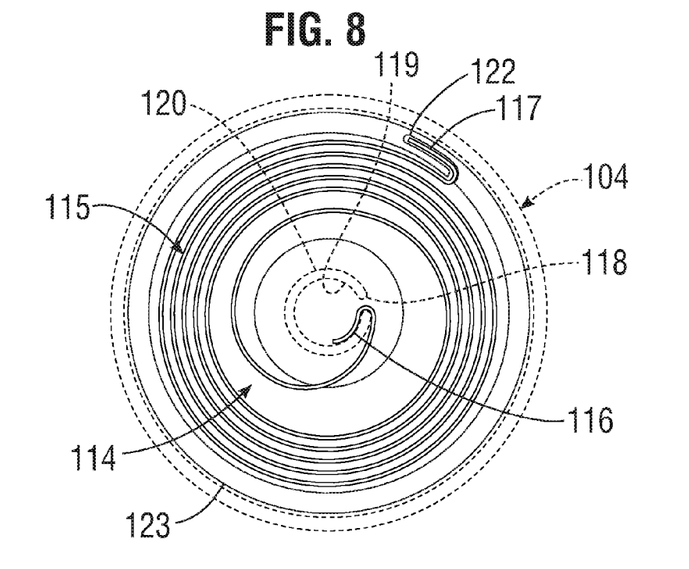
FIG. 8 is a fragmentary lower view of the pull-cord drive wheel mechanism of FIG. 7, showing a recoil spring thereof.

As shown in FIGS. 5, 7A and 8, hollow cylindrically-shaped space 114 within pulley 104 contains a flat, spirally wound recoil spring 115 which has a construction similar to that of the main spring of a table clock. Recoil spring 115 consists of single elongated rectangular strip of spring steel wound into a spiral which has flat, vertically oriented coils. A radially inwardly located end of the strip terminates in a folded-over inner tang 116, and a radially outwardly located end thereof terminates in a folded-over, outer tang 117.

As shown in FIGS. 7A and 8, inner tang 116 at the inner end of recoil spring 115 is hooked into and retained by a vertical slot 118 in the wall 119 of a small diameter cylindrical flange 120 which protrudes perpendicularly upwards from the center of the upper surface 113 of housing base plate 101. As shown in FIG. 8, outer tang 117 of recoil spring 115 engages a groove 122 in the inner circumferential wall surface 123 of pulley 104.

Figure 9:
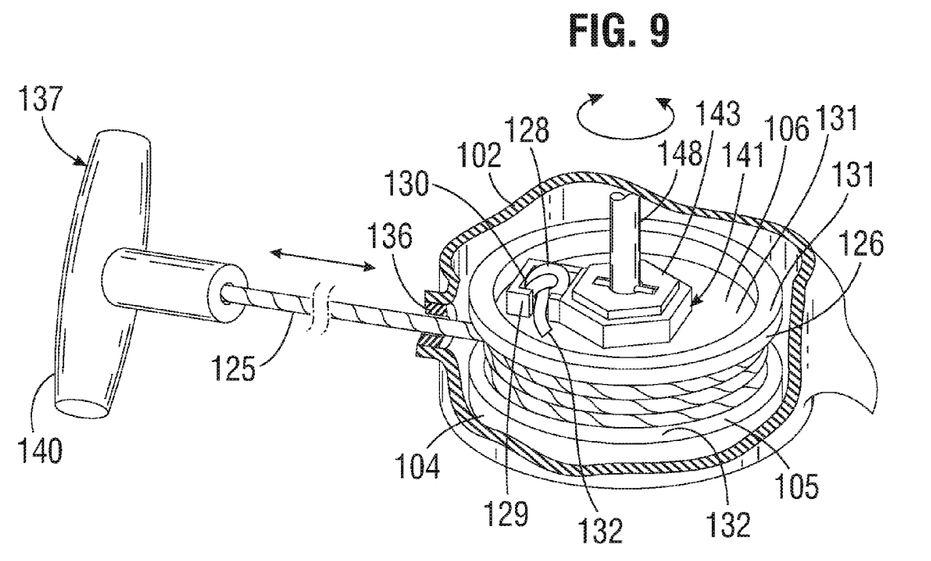
FIG. 9 is a partly sectional perspective view of the pull-cord drive wheel mechanism of FIG. 6, showing a dog-bone gear drive shaft thereof engaged by a dog-bone wheel drive nut.

Referring now to FIGS. 6 and 9, it may be seen that pull-cord power drive mechanism 11 of tool 10 includes a pull-cord 125 which is wrapped around the outer circumferential surface 133 of central body 106 of pulley 104 located between inner facing, opposed upper and lower horizontally disposed annular ring-shaped shoulders 126, 127 of upper and lower pulley sleeves 107 and 105, respectively.

As shown in FIGS. 5, 6 and 9, an inner knotted end 128 of pull-cord 125 is secured in a notch 129 located in a pull-cord retainer flange 130 which protrudes upwardly from the upper circular end wall 131 of the central body 106 of pulley 104. Pull-cord 125 pays radially outwards from notch 129, and vertically downwards through a hole 132 in upper end wall 131 of pulley 104, and thence is wrapped spirally around the outer circumferential wall surface 133 of central body 106 of the pulley.

As shown in FIG. 6, pull-cord 125 has an outer end portion 124 that protrudes radially outwards from the hollow interior space 103 of pull-cord housing 100 through the bore 135 of a bushing 136 which protrudes radially outward from the housing and communicates with the hollow interior space 103 of the housing. As is also shown in the figures, pull-cord 125 has attached to an outer end thereof a transversely disposed T-shaped pull handle 137 which receives the end of the pull-cord in a bore 138 disposed through a centrally located outwardly longitudinally disposed leg 139 of the handle, which has a transversely disposed hand grip 140.

FIGS. 3-6 illustrate structural and functional details of how a linear putting force exerted on handle 140 causes drive pulley 104 and drive gear 29, and hence cutter head 12 to rotate.

As may be understood by referring to FIGS. 5 and 6, grasping hand grip 140 of handle 137 and pulling the handle and attached cord 125 wrapped around pulley 104 causes the pulley to rotate. As shown in FIG. 6, pulley 104 has mounted on the horizontal upper surface 131 thereof a hexagonally-shaped drive socket 141 which has therein a hexagonally-shaped recess 142. Tool 10 includes a hexagonally-shaped "dog-bone" drive nut 143 which is of an appropriate size to be received vertically downwards into recess 142 of drive socket 141.

As may be seen best by referring to FIG. 6, drive nut 143 has protruding vertically downwards from an upper surface 144 thereof a bore 145 having a central circular cross-section part 146 and a pair of radially opposed slots 147a, 147b which protrude radially outwards from diametrically opposed sides of the central circular cross-section bore. Bore 145 of drive nut 143 receives vertically downwardly therein a gear drive shaft 148 which has a central circular cross-section shank 149 and a pair of radially outwardly protruding pins 150A, 150B, which are of an appropriate size and shape to fit conformally downwards into the central circular part of bore 146 in drive nut 143, and the radiating opposed slots 147A and 146B in the drive nut.

As may be seen best by referring to FIGS. 5 and 9, drive shaft 148 is pinned at an upper end thereof to drive gear 29 of gear mechanism 11.

FIGS. 1, 2 and 5 illustrate how pull-cord operated tubing cutter tool 10 is used to make a severing cut through the wall of a tubular workpiece such as a copper pipe or tube T.

As shown in phantom in FIG. 2, pivotable handle shell 17 of clamping handle 14 of tool 10 is pivoted away from fixed handle shell 16 to thereby form between inner opposed concave edges of the two handle shells a longitudinally elongated concave space for receiving therein a length of tubing T. Then, as shown in FIG. 1, tool 10 is moved laterally towards a length of tubing T to be cut, the tubing centered within the bore B formed between inner concave surfaces of handle shells 16 and 17, and pivotable handle shell 17 is pivoted towards fixed handle shell 16. Handle 14 is then grasped in the palm of a workman and squeezed as shown in FIG. 1, thus causing the inner concave surfaces of the handle shells to exert a compressive gripping force on the outer circumferential wall surface of tubing T.

Next, as shown in FIG. 1, hand grip 140 of pull-cord handle 137 is grasped in the other hand of the workman, and pulled briskly outwards. Radially outward motion of pull-cord 125 from pull-cord housing 100 causes pulley 104 to rotate. Rotation of pulley 104 in turn causes drive shaft 148 and thus drive gear 29 to rotate, thus causing cutter 12 to rotate around and cut through the wall of tubing T.

When tensional pulley force on pull-cord handle 137 is released, tension in recoil spring 115 exerts a torque on pulley 104, causing the pulley to rotate in a reverse direction, thus retracting pull-cord 125 into housing 100 thereby rewinding the cord on the pulley, and readying tool 10 to be used for another cutting operation.

Figure 10:
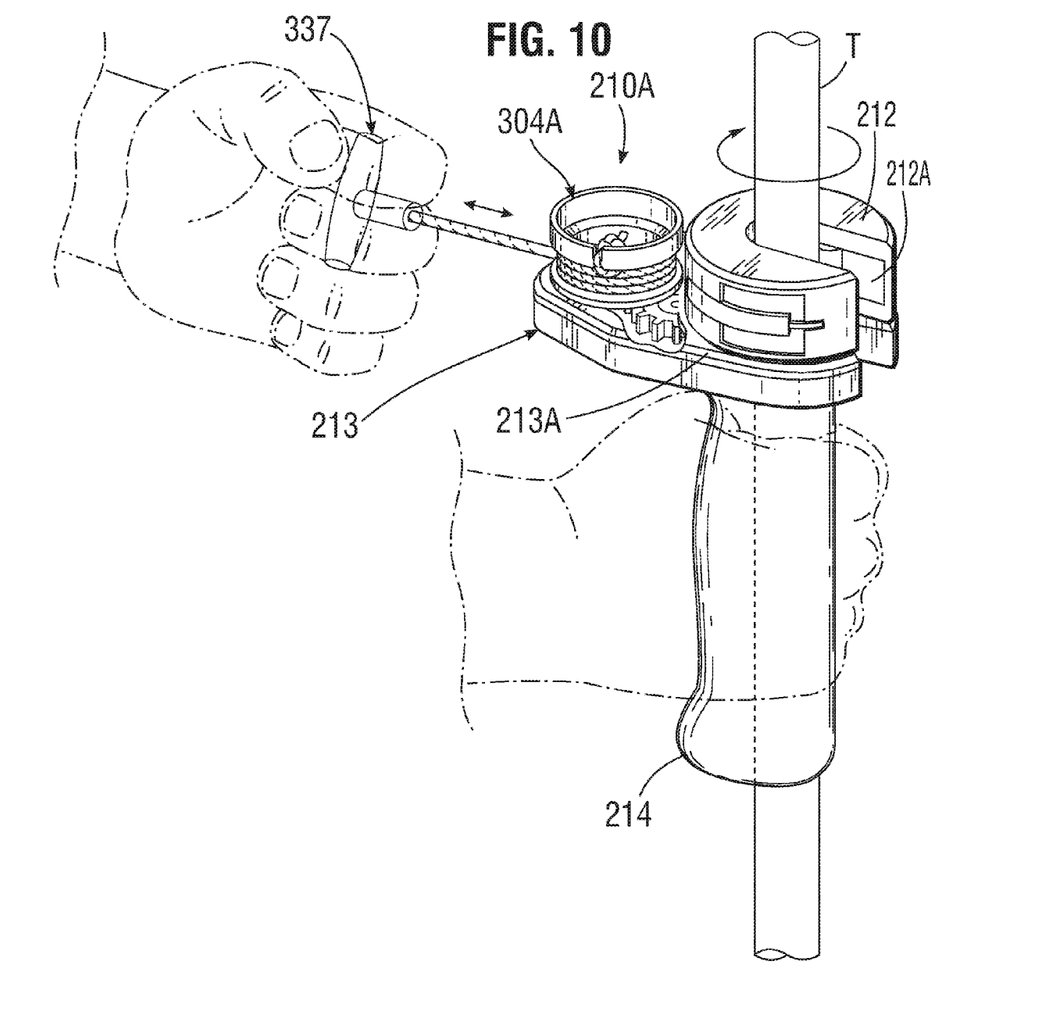
FIG. 10 is a perspective view of an alternate embodiment of the tool of FIG. 1.
Figure 11:
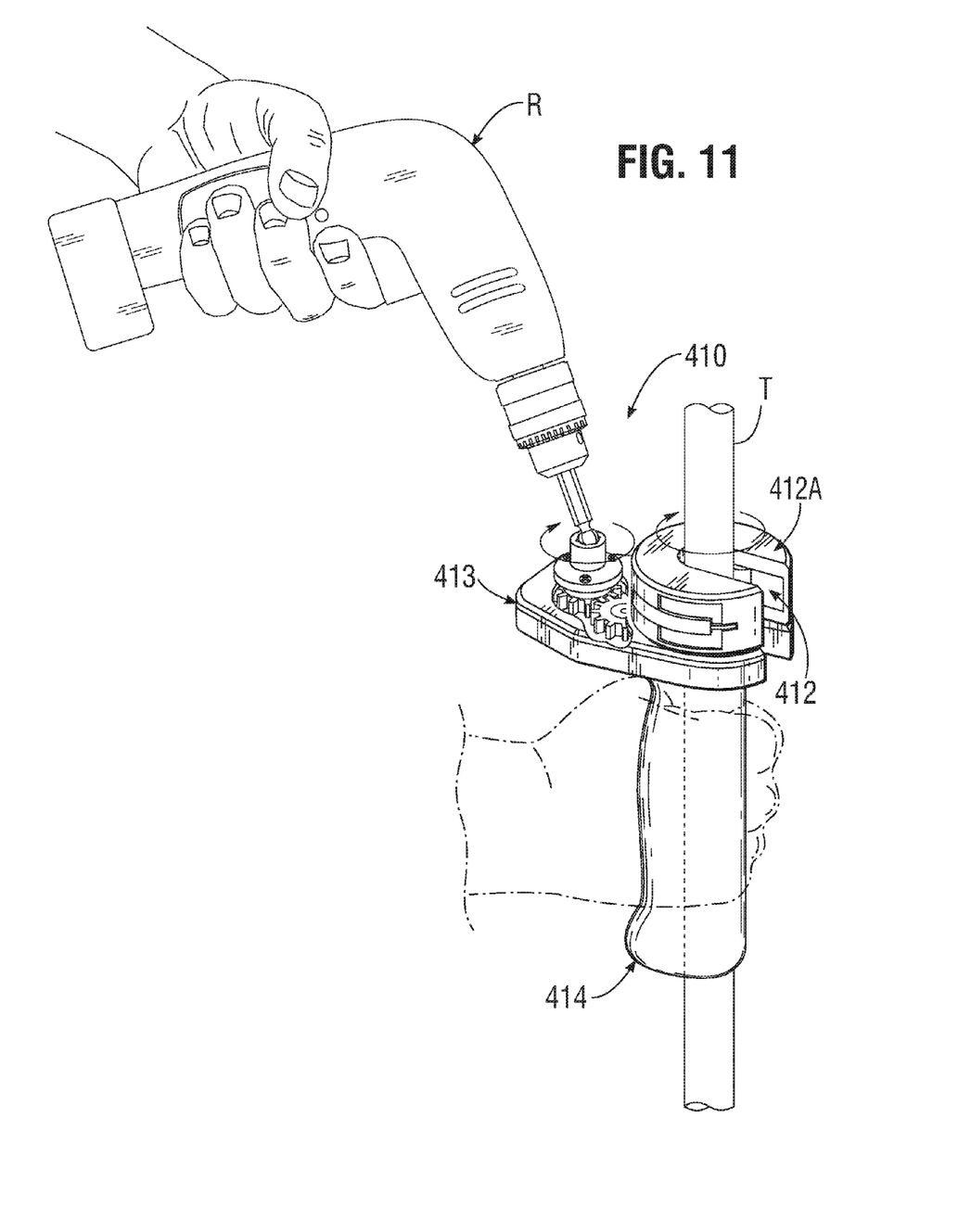
FIG. 11 is a perspective view of another embodiment of the tool of FIG. 1.

FIG. 10 illustrates an alternate embodiment 210A of a pull-cord operated tubing cutter according to the present invention, in which the drive pulley 304A is mounted on the upper surface of upper cover plate 213A of a gear drive mechanism 213.

FIG. 11 illustrates another embodiment 410 of the tubing cutter with clamping handle according to the present invention which has a gear mechanism 413 that may be rotatably driven by an external rotary power apparatus R such as an electric drill. The structure and function of the gear mechanism 413 and cutter 412 of tubing cutter 410 are exactly analogous to those of corresponding elements of the tool shown in FIGS. 1 and 2 of U.S. Pat. No. 7,845,080.

Optionally, alternate embodiment 210A shown in FIG. 10 may be modified by providing it with a removable or preferably, a disengageable retractor spring, and a centrally located drive socket which protrudes upwardly from drive pulley 304A and is engageable by a rotary power source, in an arrangement of the type shown for embodiment 410 in FIG. 11. With this modified construction, the alternate embodiment of the tubing cutter 210A shown in FIG. 10 can be operated alternatively by a pull cord or external rotary power source, at the option of a user of the cutter.

FIGS. 12-15 illustrate another embodiment 510 of a tubing cutter tool with clamping handle according to the present invention. The construction and function of tool 510 are similar to that of the basic pull-cord embodiment of the tool shown in FIGS. 3, 4A, 4B and 5 and described above. However, as is explained in detail below, tubing cutter tool 510 uses a rotary electric motor 511 instead of a pull-cord drive wheel mechanism to provide rotary drive power to a gear drive mechanism 513 which in turn rotatably drives a crescent-shaped cutter head 512 mounted on the top of the gear drive mechanism. Tubing cutter tool 510 also has an elongated clamping handle 514 which depends downwardly from the gear drive mechanism 513, and has a somewhat different construction than handle 14.

Figures 12, 13, 14:
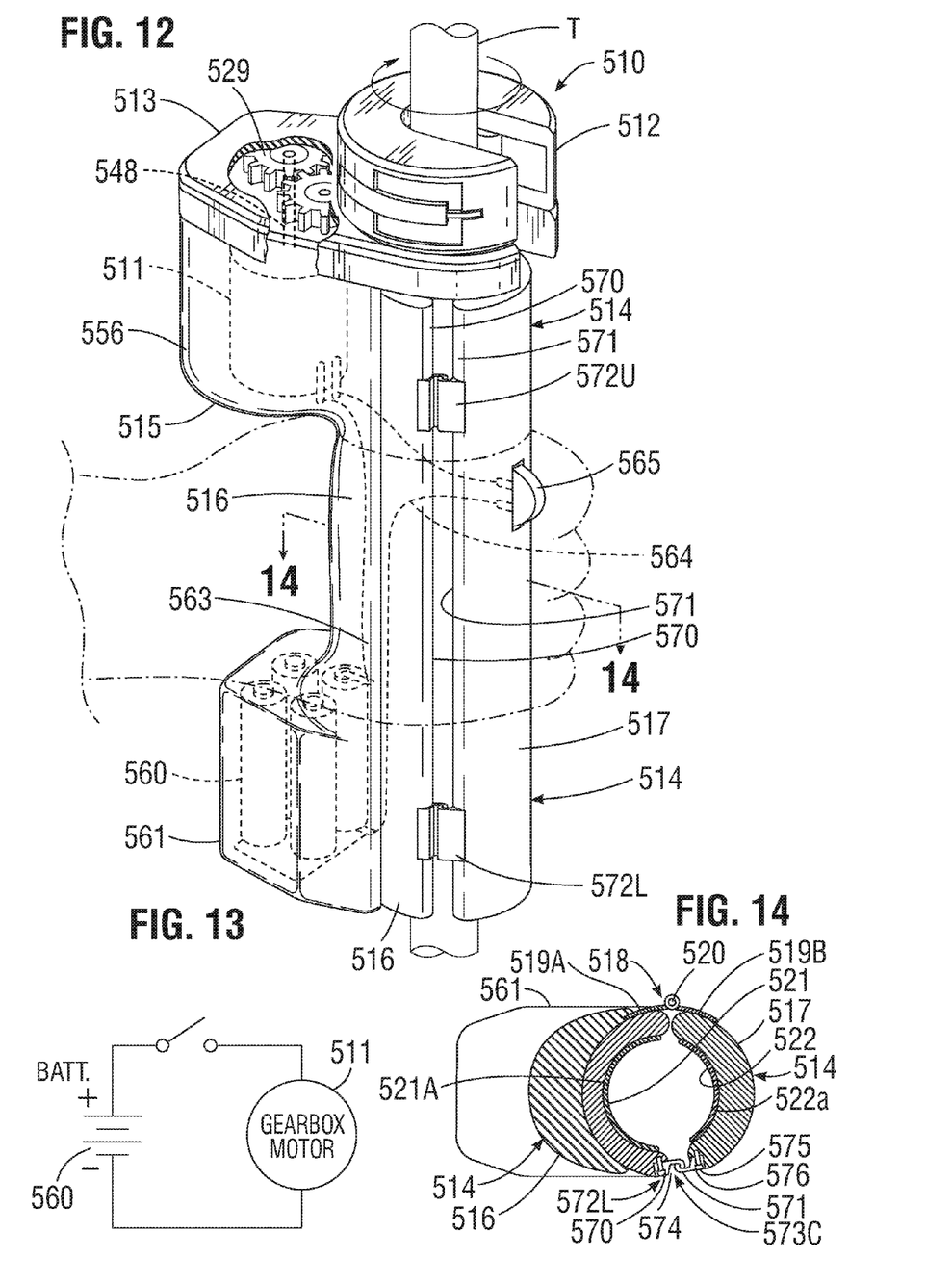
FIG. 12 is a partly broken away perspective view of another embodiment of a tubing cutter tool with clamping handle according to the present invention, which includes an integral electric motor and battery.
FIG. 13 is a schematic diagram of the motor and battery of the tubing cutter tool of FIG. 12.
FIG. 14 is a transverse sectional view of the clamping handle of the tool of FIG. 12, taken in the direction of line 14-14.

As shown in FIG. 12, tubing cutter 510 also includes a battery 560 which is located in a battery housing 561 which extends rearward from a lower end part 562 of handle 514. Battery 560 is connected through wires 563, 564, and a series electrical switch 565 to motor 511. Motor 511 is located in a housing 556 which extends rearward from an upper end of handle 514. As shown in FIG. 12, output shaft 548 of motor 511 is pinned to input driving gear 529 of gear drive mechanism 513.

Figure 15:
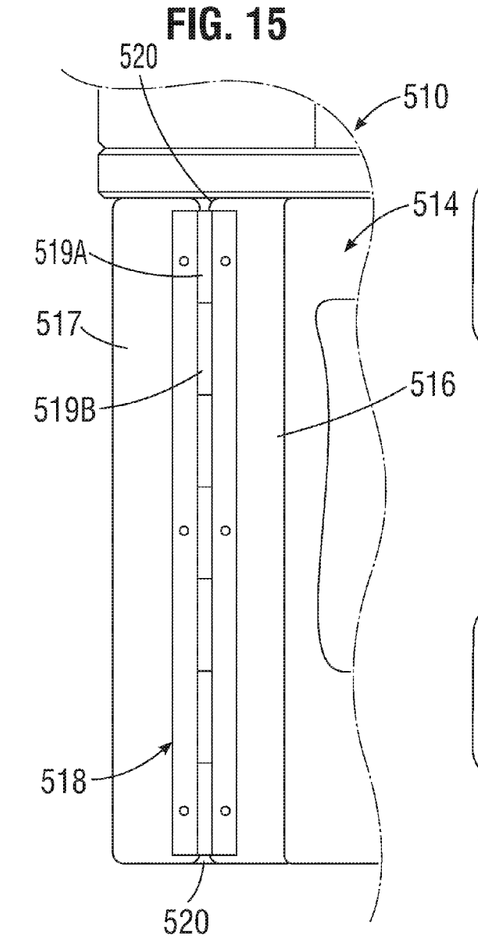
FIG. 15 is a left side elevation view of the tool of FIG. 12.

Referring now to FIGS. 12 and 14, it may be seen that clamping handle 514 is constructed of two generally semi-cylindrically-shaped vertically elongated shells including a fixed rear shell 516 that is mounted fixedly to the lower surface of gear mechanism base plate 515. Handle 514 includes a second, pivotable handle shell 517 which has an inner shape that is generally mirror symmetric to that of fixed handle shell 516, through a vertical longitudinal medial plane of the handle. As shown in FIGS. 14 and 15, pivotable handle shell 517 is pivotably mounted to rear fixed handle shell 516 by a longitudinally disposed, piano-hinge type hinge 518 which joins confronting longitudinally disposed edges 516A and 517A of rear and front handle shells 516, 517, respectively. Hinge 518 has interdigitated tubular sections 519A, 519B which are hingedly joined by a disposed hinge pin 520 disposed longitudinally through the sections.

As may be seen best by referring to FIG. 14, fixed rear handle shell 516 and pivotable front handle shell 517 have disposed longitudinally or vertically through their lengths elongated semi-circular cross-section bores 521, 522, to which are secured elongated, thin elastomeric pads 521A, 522A which have the shape of thin, semi-cylindrical shells.

As shown in FIGS. 12 and 14, when handle shells 516 and 517 are pivoted towards one another and a compressive force exerted on the outer surfaces of the handle shell by being gripped in the palm of a person's hand, a compressive gripping force may be exerted on the outer circumferential surface of a length of tubing T or pipe to thus retain the tool 510 in a fixed position relative to the tubing, as shown in FIG. 12.

A preferred embodiment of tubing cutter tool 510 includes one or more releasable fastener clamps to hold handle 514 in secure compressive contact with a length of tubing to be cut. Thus, as shown in FIGS. 12 and 14, confronting longitudinal edges 570, 571 of rear and front handle 516, 517 have protruding circumferentially outwards therefrom upper and lower snap clip-on spring clasp fasteners 572U, 572L.

Each fastener 572 consists of an outwardly concave U-shaped leaf spring 523 which has a U-shaped groove 574 protruding outward from one handle shell, and an inwardly concave U-shaped leaf spring 575 which has an outwardly concave U-shaped groove 576 which protrudes outwards form the other handle shell. When the handle shells 516, 517 are squeezed towards one another to grip the outer circumferential surface of a length of tubing to be cut, the end tab 577 of the inwardly concave clip springs into an outwardly concave groove in the other spring tab, and the end tab 578 of the outwardly concave spring clip springs into the inwardly concave groove of the other spring clip, thus securing the spring tabs into locking engagement. The spring clips 573, 575 are effective in holding handle shells 516, 517 tightly clamped together and onto a length of tubing to be cut until manually disengaged by a workman after the tubing has been cut.

Figure 16A:
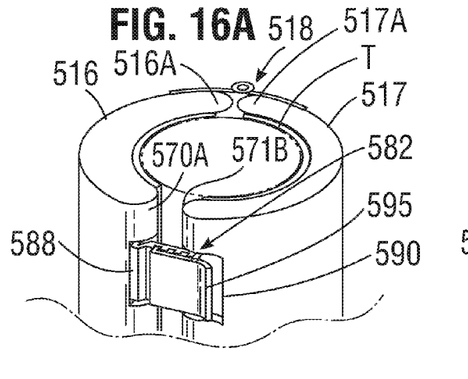
FIG. 16A is a modified fragmentary view of the tool of FIG. 12, showing a modified handle fastener.
Figure 16B:
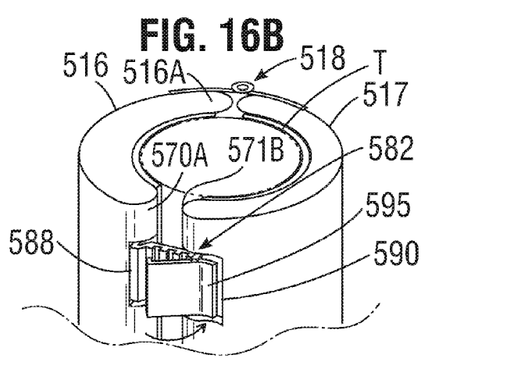
FIG. 16B is a view similar to FIG. 16A, showing how the modified fastener is released.
Figure 17A:
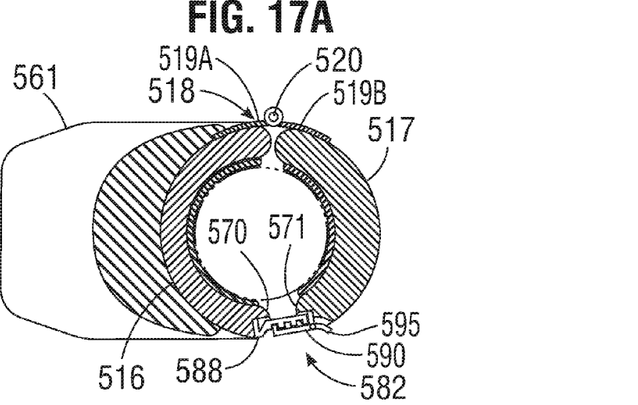
FIG. 17A shows the fastener of FIG. 16A being used to clamp onto a tube of a first diameter.
Figure 17B:
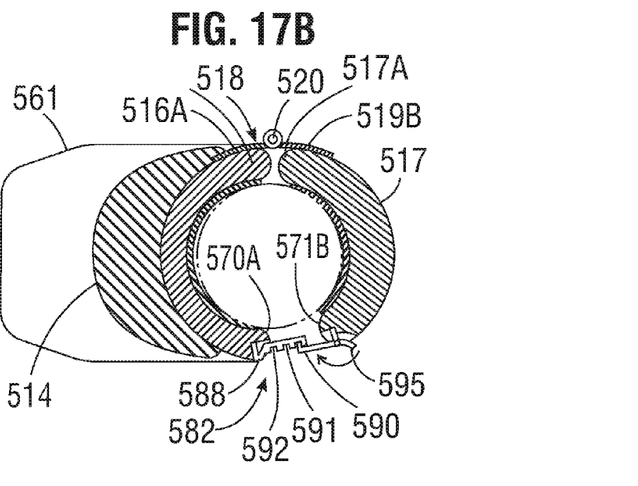
FIG. 17B is a view similar to FIG. 17A, showing the fastener being used to clamp onto a length of tubing of a larger diameter than that shown in FIG. 17A.

FIGS. 16A to 17B illustrate a modified fastener 582 which uses a modification of spring clips 573 and 575. One or both modified spring clips 588, 590 are provided with multiple interlocking grooves 591, 592 which are spaced circumferentially apart from one another. As shown in FIGS. 17A and 17B, this construction enables positioning confronting free edges 516A and 516B spaced apart at different distances, thus facilitating clamping handle 514 to tubing of different diameters, such as ½ inch and ¾ inch.

As is also shown in FIGS. 16A and 16B, one or more of modified spring clips 588, 590 is optionally provided with a circumferentially inwardly protruding lever 595. Pressing radially inwards on lever 595 causes the spring tab at the other end of the spring fastener to move radially outwards from engagement in the groove of the other spring fastener, thus facilitating clamp disengagement and removal of handle 514 from a length of tubing.

What is claimed:

1. A tube cutting tool comprising;
   a. a gear housing with an input opening and an output opening;
   b. a gear mechanism housed in the gear housing, the gear mechanism including an input gear and an output gear, the output gear having a first opening;
   c. a rotary power source mounted fixedly to said gear housing, said rotary power source having an output shaft rotatably connected to the input gear of said gear mechanism via the input opening;
   d. a generally cylindrically shaped rotary cutting head extending from said gear housing, said cutting head having a second opening which is rotatably connected to the output gear via the output opening of said gear housing, the cutting head having at least one cutting blade in communication with the second opening;
   e. a clamping handle including a first longitudinally elongated semi-cylindrically shaped handle shell fixed to the gear housing and a second longitudinally elongated handle shell pivotably mounted to the first handle shell, the second handle shell being pivotable between an open position and a closed position, in which the handle shells define a third opening, and
   f. the output opening, the first opening, the second opening, and the third opening are axially aligned so as to define a combined opening to receive a tube to be cut, when the tube is received in the combined opening, the shells acting as a clamp for the tube and the rotary power source is operated to rotate, via the input and output gears, the cutting head which cuts the tube via the at lease one cutting blade.

2. The tube cutting tool of claim 1 wherein at least one of the handle shells has on an inner concave surface thereof a friction pad for gripping the tube.

3. The tube cutting tool of claim 1 wherein the gear housing further comprises a semi-cylindrical bearing sleeve defining an end portion of the output opening and the bearing sleeve being received in the first opening of the output gear.

4. The tube cutting tool of claim 1 wherein the output gear has a semi-cylindrical raised portion extending through the output opening and defining the connection between the cutting head and the output gear.

5. The tube cutting tool of claim 1 wherein the gear mechanism further comprises at least one intermediate gear connecting the input gear and the output gear.

6. The tube cutting tool of claim 1 wherein a shaft extending through the input opening and being connected to the power source at one end and to the input gear at another end defines the connection between the rotary power source and the input gear.

7. The tube cutting tool of claim 1 wherein said rotary power source is an electric motor.

8. The tube cutting tool of claim 1 wherein at least one of the handle shells has on an inner concave surface thereof a friction pad for gripping the tube.

9. The tube cutting tool of claim 1 further including at least one releasable clamping fastener for releasably holding said first and second handle shells in compressive contact with a length of tubing received between said handle shells.

* * * * *